(12) United States Patent
Guern

(10) Patent No.: US 7,167,584 B2
(45) Date of Patent: Jan. 23, 2007

(54) DEVICE FOR ACQUIRING A THREE-DIMENSIONAL SHAPE BY OPTOELECTRONIC PROCESS

(75) Inventor: Yves Guern, Jouques (FR)

(73) Assignee: Cynovad Inc., Ville St-Laurent (CA)

( * ) Notice: Subject to any disclaimer, the term of this patent is extended or adjusted under 35 U.S.C. 154(b) by 613 days.

(21) Appl. No.: 10/240,760

(22) PCT Filed: Apr. 13, 2001

(86) PCT No.: PCT/FR01/01167

§ 371 (c)(1),
(2), (4) Date: Mar. 31, 2003

(87) PCT Pub. No.: WO01/79784

PCT Pub. Date: Oct. 25, 2001

(65) Prior Publication Data

US 2003/0169432 A1     Sep. 11, 2003

(30) Foreign Application Priority Data

Apr. 14, 2001 (FR) .................................. 00 04954

(51) Int. Cl.
*G06K 9/00* (2006.01)

(52) U.S. Cl. ...................... 382/154; 359/740; 359/837; 356/127; 356/601; 356/612; 250/341.8; 250/559.22

(58) Field of Classification Search ................ 382/154, 382/260, 264, 285; 359/557, 683, 676, 630, 359/740, 753, 554, 637, 837; 250/227.2, 250/396 ML, 559.22, 341.8; 356/601, 602, 356/608, 612, 127, 237.1
See application file for complete search history.

(56) References Cited

U.S. PATENT DOCUMENTS

| | | | | |
|---|---|---|---|---|
| 5,825,486 A | * | 10/1998 | Zavislan et al. | 356/326 |
| 6,088,134 A | * | 7/2000 | Schmidt | 358/482 |
| 6,128,144 A | * | 10/2000 | Togino | 359/728 |
| 6,249,391 B1 | * | 6/2001 | Hayakawa et al. | 359/834 |
| 6,327,041 B1 | * | 12/2001 | Guern | 356/601 |
| 6,473,243 B1 | * | 10/2002 | Omura | 359/730 |

FOREIGN PATENT DOCUMENTS

| | | |
|---|---|---|
| EP | 0 267 705 | 5/1988 |
| GB | 2 096 793 | 10/1982 |
| WO | WO 96/41123 | 12/1996 |
| WO | WO 98/49522 | 11/1998 |

\* cited by examiner

*Primary Examiner*—Sheela Chawan
(74) *Attorney, Agent, or Firm*—Ogilvy Renault LLP

(57) ABSTRACT

The invention concerns a device for acquiring the three-dimensional shape of an object (10) by opto-electronic process, comprising a chromatic system (18) for illuminating the object (10) and for picking up the light reflected or backscattered by the object (10), and a reflecting mirror (26) placed on the optical axis between the optical system (18) and an illumination slot (16) for deflecting the light reflected by the object towards a spectral analysis means (30).

10 Claims, 2 Drawing Sheets

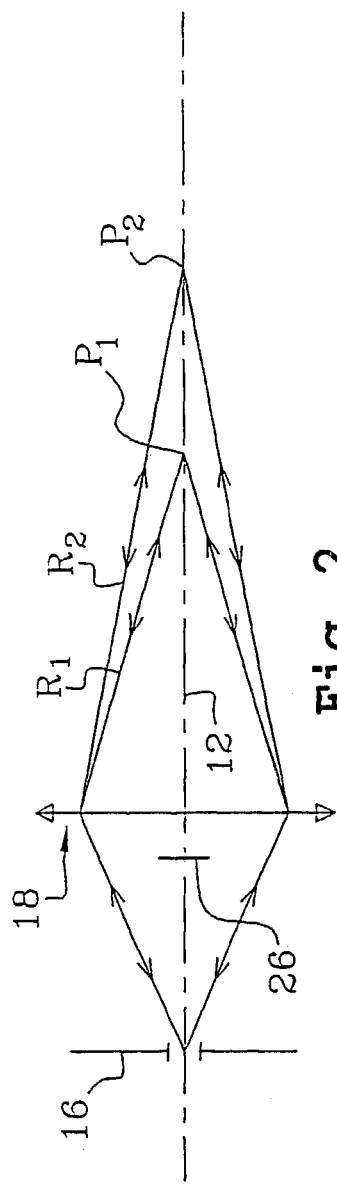
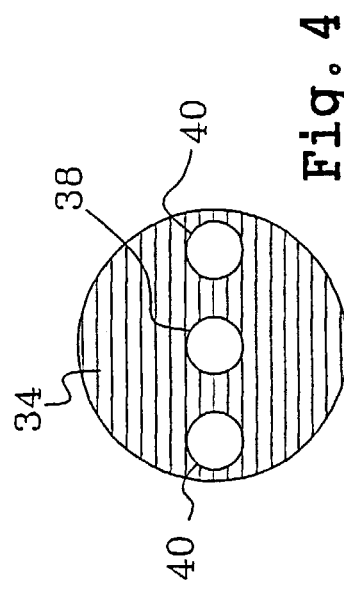
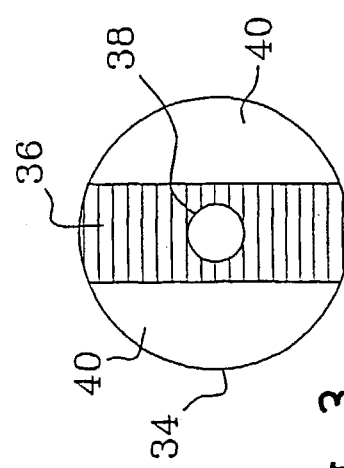
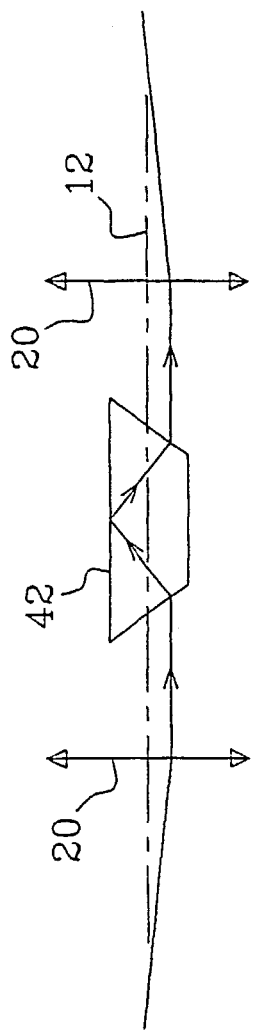

DEVICE FOR ACQUIRING A THREE-DIMENSIONAL SHAPE BY OPTOELECTRONIC PROCESS

CROSS-REFERENCE TO RELATED APPLICATIONS

The application claims priority of international application 00/04954 filed Apr. 14, 2000.

FIELD OF THE INVENTION

The invention relates to an apparatus for opto-electronically acquiring a three-dimensional shape, of the type described in international application WO99/64816.

BACKGROUND OF THE INVENTION

International application WO99/64816 describes an apparatus for acquiring shapes comprising lighting means, the lighting means comprising a luminous polychromatic source and a chromatic lens, the lighting means coupled to an optical system for magnification, means for sensing light reflected or backscattered by an illuminated object, and spectral analysis means for analyzing sensed light, coupled to data processing means. The spectral analysis means are on the optical axis of the light sensing means, while the lighting means are offset angularly and illuminate the object by means of a semi-transparent blade placed on the optical axis of the light sensing means.

This known apparatus performs to a satisfying degree, with a measurement depth that is relatively high and notably superior to other apparatus in the state of the art.

SUMMARY OF THE INVENTION

Accordingly, an object of the present invention is to perfect the apparatus described above and improve its performance.

According to a first broad aspect of the present invention, there is provided an apparatus for opto-electronically acquiring three dimensional shapes, the apparatus comprising a luminous source with a continuous spectrum, an illumination slot provided on the optical axis in front of the source, an optical image forming system, an optical light sensing system for sensing light reflected by the object, spectral analysis means for analyzing the spectrum of the light sensed by the light sensing means, and data processing means coupled to the spectral analysis means, wherein the image formation system and the image sensing system are comprised within one optical chromatic system and wherein light reflected by the object and being output by the optical chromatic system is reflected off a mirror placed on the optical axis between the illumination slot and the optical system and is deflected towards an analysis slot placed on the optical axis of the spectral analysis means.

The apparatus, according to the present invention, provides several advantages with respect to other known techniques. The depth of the field and the measurement depth are increased. The apparatus is less sensitive to parasitic wavelengths and the measurements are more precise.

Alternatively, the mirror is a mask that intersects the light rays output from the illumination slot on the optical axis towards the object. This mask avoids illuminating a point on the surface of the object with a set of rays of different wavelengths and facilitates locating the point on the optical axis by illuminating with only one wavelength.

Preferably, the optical chromatic system is afocal and an optical magnification system, preferably afocal, is mounted on the optical axis between the optical chromatic system and the illuminated object.

In order to obtain a telecentric path of rays and to reduce shadow zones on the illuminated object, a mask comprising a circular hole can be placed on the optical axis to allow reflected rays to pass through, the mask being placed in the centre of the optical chromatic system and comprising at least two lateral orifices for the passage of illumination light for the object.

In order to increase the signal to noise ratio and therefore increase the precision of the measurement (or the gain of the signal when it is weak), the spectral analysis means can comprise a matrix of cameras of type CCD or analog, wherein the outputs of the cameras are coupled to means for analog to digital conversion via low pass filters that eliminate noise due to high frequencies on analog signals at the output of the sensing means.

According to another alternative embodiment, the apparatus also comprises optical image rotation means placed on the optical axis in an area intersected by the illuminating light of the object and by the light reflected by the object, the image rotation means comprising, for example, a DOVE (Distributed Object Visualization Environment) prism that can be placed in the optical chromatic system.

By rotating the prism around the optical axis, we can rotate around the optical axis the measurement profile on the illuminated object. This allows a rotating sweep of the illuminated surface of the object without relative displacement between the acquiring means and the illuminated object in order to acquire the three-dimensional shape in a cylindrical volume of measurement that is defined by the rotation of the measurement profile around the optical axis.

BRIEF DESCRIPTION OF THE DRAWINGS

These and other features, aspects and advantages of the present invention will become better understood with regard to the following description and accompanying drawings wherein:

FIG. 2 is a simplified partial view illustrating the operation of the apparatus;

FIG. 3 is a frontal view of a mask used for obtaining a telecentric path of rays;

FIG. 4 is a frontal view of an alternative embodiment for the mask of FIG. 3;

FIG. 5 is a schematic showing the optical image rotation means within the apparatus according to the present invention.

DETAILED DESCRIPTION OF THE PREFERRED EMBODIMENT

Figure 1:
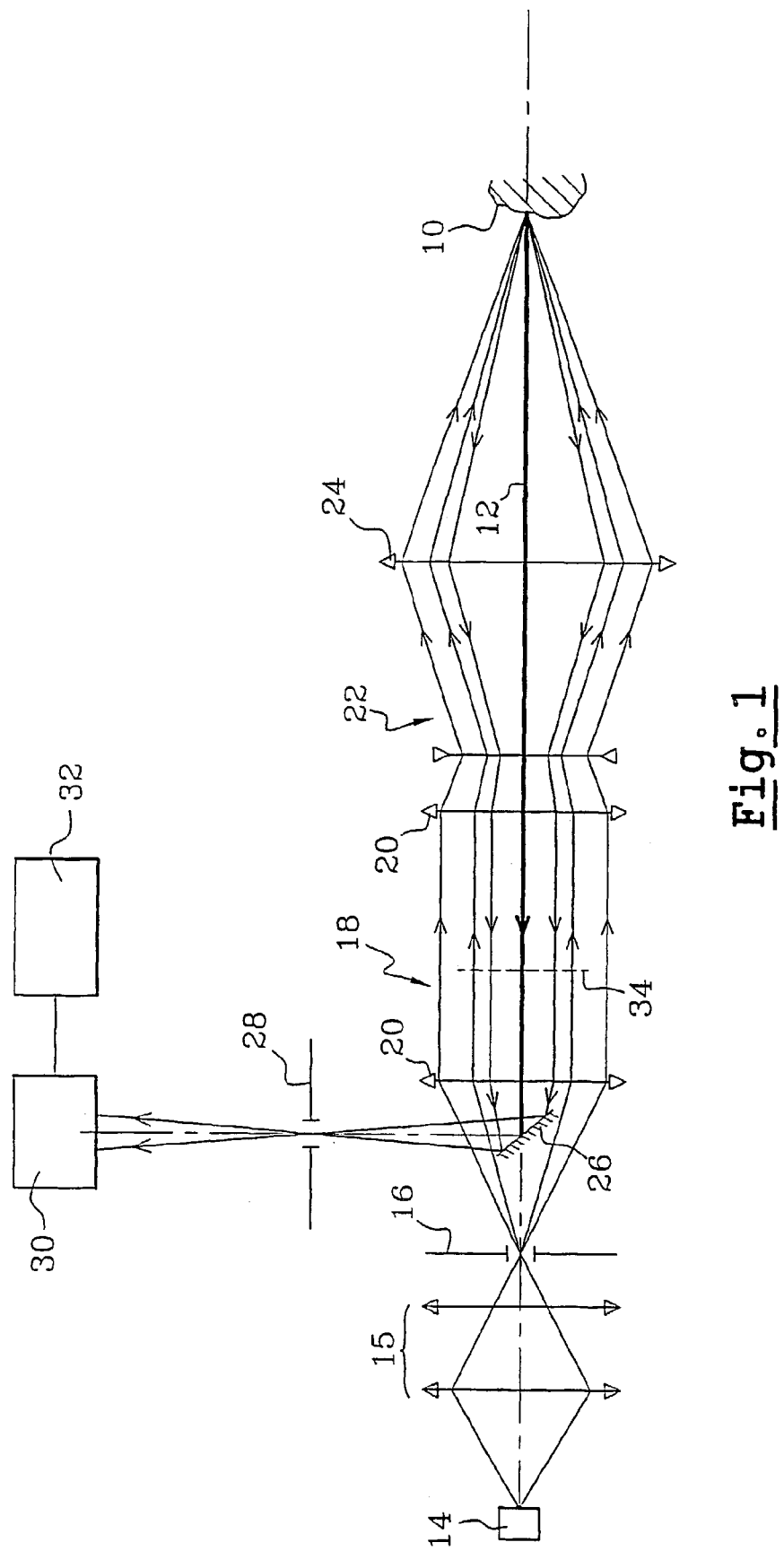
FIG. 1 is a schematic of the apparatus according to the invention.

In FIG. 1, reference numeral 10 designates an object for which we want to acquire a three dimensional shape, the object being on the optical axis 12 of an apparatus according to the invention, the apparatus comprising an illuminating source 14 with a continuous spectrum, connected by, for example, optical fibers to the focal point of an optical system 15 which is a condenser that focalizes light emitted by the source 14 through an illumination slot 16 placed on the optical axis 12.

The slot 16 is followed by an optical chromatic system 18 which in this case is an afocal system, comprising two identical chromatic lenses 20, the slot 16 being at the focal point of the first lens 20.

The optical chromatic system is followed by an optical magnifying system 22, preferably afocal.

The illuminated object 10 is placed approximately at the focal point of the last lens 24 of the optical magnifying system.

The optical chromatic system 18 comprises the light sensing system to sense light reflected or backscattered by the surface of the object 10, and a reflecting mirror 26 is placed on the optical axis between the illuminating slot 16 and the first lens 20 of the chromatic system 18 in order to deflect, preferably perpendicularly to the optical axis 12, the light sensed, in the direction of the analysis slot 28 placed on the optical axis of the spectral analysis means 30 that is coupled to data processing means 32.

The spectral analysis means 30 are, for example, such as those described in international patent application WO99/64816, hereby incorporated by reference.

The apparatus described according to the present invention provides the advantage that, with respect to the apparatus described in the document cited above and incorporated by reference, it does not use semi-transparent blades placed on the optical axis to illuminate the object and sense the luminous flux reflected or backscattered by the illuminated object. The use of a semi-transparent blade necessarily implies that a major portion of the luminous flux reflected or backscattered by the illuminated object is lost. In the apparatus as shown in FIG. 1, the gain of the luminous flux reflected or backscattered by the object 10 is within a range of 2 to 4, approximately, with respect to the embodiments described in previous documents cited above.

Another advantage of the apparatus according to the invention will now be described in reference to FIG. 2.

In this figure, in order to simplify it, the optical chromatic system 18 is represented by a single lens and the mirror 26 is represented by a mask that is placed on the optical axis 12 and that intersects the central polychromatic light rays exiting the illumination slot 16.

Since the optical system 18 is a chromatic system with a focal length that varies continuously with wavelength, the different wavelengths exiting the illumination slot 16 are focalized at different points on the optical axis 12. For example, a luminous ray R1 having wavelength $\lambda 1$ is focalized at point P1, and a luminous ray R2 having wavelength $\lambda 2$ greater than $\lambda 1$ is focalized on the axis 12 at a point P2 which is further from the chromatic system 18 than point P1.

If the wavelengths of rays R1 and R2 correspond to the extremities of the wavelength illumination band, than the distance P1–P2 on the optical axis 12 represents the measurement depth.

Since the central luminous rays exiting the illumination slot 16 are intersected by the mask 26, we can say that point P1 on the axis 12 is illuminated uniquely or almost uniquely by a light of wavelength $\lambda 1$, point P2 will be illuminated by a light of wavelength $\lambda 2$, and a point P1 in between P1 and P2 will be illuminated by a light of wavelength $\lambda 1$ in a range between $\lambda 1$ and $\lambda 2$.

Since the optical chromatic system 18 comprises the optical sensing system that senses light reflected or backscattered by the object, the light rays of wavelength $\lambda 1$ reflected or backscattered by the point P1 are focalized on the optical axis 12 at the illumination slot 16, the light rays of wavelength $\lambda 2$ reflected or backscattered by the point P2 are also focalized on the illumination slot 16, and the light rays of wavelength $\lambda i$ reflected by the intermediate point Pi are focalized on the illumination slot 16.

This shows that a clear image can be formed from any point on the axis between points P1 and P2 by the chromatic system 18 on the spectral analysis means, without adjustment to the apparatus.

This also shows that if a parasitic light ray having a wavelength different from $\lambda 1$ is reflected by point P1, this parasitic light ray will not be focalized at the illumination slot 16 and a clear image of point P1 at the wavelength(s) of the parasitic light ray will not be formed on the spectral analysis means.

The optical chromatic means 18 therefore allow a spectral filtering of the sensed light to occur, while ensuring the clearness of the image formed on the spectral analysis means on the entire range of measurement depth useful along the optical axis 12, and the measurements are more precise.

The analysis slot provides a spectral filtering and a spatial filtering of the sensed light.

To improve the performance of the apparatus, a telecentric analysis channel that avoids or reduces the shadow zones on the illuminated object 10 is provided via a mask 34 shown in FIG. 3 and placed at the center of the optical chromatic system 18, the mask 34 comprising a central zone 36 of intersection of the light rays, provided by a circular axial hole 38 that lets reflected light through, that is, light reflected or backscattered by the object 10.

The illumination light exiting the slot 16 passes on each side of the central section, as shown by reference numeral 40.

Alternatively, and as shown in FIG. 4, the sections 40 for the illumination light to pass through can be reduced to circular orifices formed within a disc 34 comprising a central hole 38 for reflected light to pass through.

With mask 34 of FIG. 4, a vertical telecentric illumination path is provided.

As already stated in prior art reference WO99/64816, hereby incorporated by reference, a profile image of the illuminated surface of the object 10 can be formed on spectral analysis means 30, which comprise a matrix of cameras, such as CCD or analog cameras. A rotational sweep of the illuminated surface of the object 10 can be done using an optical image rotation system, such as a DOVE prism placed in the apparatus according to the invention on the optical axis 12, in a zone that is intersected by the illumination light and by the sensed light. For example and as shown in FIG. 5, the DOVE prism 42 can be placed between two lenses 20 of the chromatic system 18. The rotation of the DOVE prism 42 around the optical axis 12 produces the result of rotating around the axis the measurement profile on the illuminated surface of the object 12, the rotation of the profile being twice as good as that of the prism. We can then obtain, without any other displacements of the apparatus according to the invention or of the object 10, a three dimensional shape of the surface of the object 10 illuminated by a luminous cylindrical axis 12 which has a diameter equal to the length of the measurement profile.

To increase the signal to noise ratio of the signals exiting the CCD sensors of the camera matrix, a low pass filter is used to connect the sensor outputs to means for analog to digital conversion that connect the spectral analysis means 30 to signal processing means 32. Typically, the cut-off frequency of the low pass filter is approximately 1 MHz.

In the embodiment of the apparatus shown in FIG. 1, the lenses 20 of the chromatic system 18 have a focal length of 60 mm, the lens 24 of the optical magnifying system has a focal length of 150 mm, the transversal magnifying ratio of the system 22 is 3, and the measurement depth on the optical axis 12 is approximately 40 mm. The image formed on the analysis means is clear without any adjustments on the entire measurement depth (in prior art techniques, the range of clearness of the image is approximately ±4 mm from a central position according to a setting). Furthermore, the spectral width of the signal is approximately two times smaller in the apparatus according to the invention than in the prior art techniques, and the precision is uniform on the entire measurement depth (0.01%) instead of having a bell curve-type variation with a progressive degradation when moving away from the central position.

What is claimed is:

1. An apparatus for opto-electronically acquiring three dimensional shapes of an object, the apparatus comprising:
   a continuous spectrum light source (14);
   an illumination slot (16) on an optical axis in front of the source (14);
   an optical chromatic image forming system (18) for forming an image on the object (10) and sensing light reflected by the object (10):
   spectral analysis means (30) for the reflected light; and
   data processing means (32) coupled to the spectral analysis means (30); characterized in that it comprises a mirror (26) placed on the optical axis (12) between the illumination slot (16) and the optical system (18) to intercept the light rays output from the illumination slot (16) on the optical axis (12) in the direction of the object (10) and to also intercept light reflected from the object (10) and output from the optical system (18) and deviate it.

2. An apparatus as claimed in claim 1 characterized in that the optical chromatic system (18) is afocal.

3. An apparatus as claimed in claims 1 or 2, characterized in that the optical chromatic system (18) is formed by two Identical chromatic lenses (20).

4. An apparatus as claimed in one of the preceding claims, characterized in that a magnifying optical system (22) is mounted on the optical axis (12) in between the optical chromatic system (18) and the object (10).

5. An apparatus as claimed in claim 4, characterized in that the magnifying optical system (22) is afocal.

6. An apparatus as claimed in one of the preceding claims, characterized in that a mask (34) comprising a circular axial hole (38) for passing reflected light from the object (10) and two orifices (40) for passing light illuminating the object (10) is placed at a center of the optical chromatic system (18).

7. An apparatus as claimed in one of the preceding claims, characterized in that the spectral analysis means (30) comprises a matrix of sensors of type CCD or analog having outputs connected to means for analog to digital conversion via a low-pass filter.

8. An apparatus as claimed in one of the preceding claims, characterized in that it comprises optical image rotation means (42) placed on the optical axis (12) in a zone traversed by the illumination light for the object and by the light reflected by the object.

9. An apparatus as claimed in claim 8, characterized in that the optical image rotation means are a DOVE prism (42) placed for example in the optical chromatic system (18) cited above.

10. An apparatus as claimed in claim 1, wherein said output is deviated perpendicularly to the optical axis (12) towards an analysis slot (28) placed on the optical axis of the spectral analysis means (30).

* * * * *